(12) United States Patent
Blakelock et al.

(10) Patent No.: US 6,218,759 B1
(45) Date of Patent: Apr. 17, 2001

(54) GENERATOR CORE END SUPPORT RING FOR APPLYING A RADIAL OUTWARD FORCE TO ARMATURE WINDINGS OUTBOARD OF STATOR CORE SLOT DOVETAILS

(75) Inventors: Thomas R. Blakelock, Clifton Park; Thomas R. Butman, Jr., Delmar; Alan M. Iversen, Clifton Park, all of NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/453,332

(22) Filed: Dec. 2, 1999

(51) Int. Cl.⁷ ............................................. H02K 1/12
(52) U.S. Cl. ........................ 310/254; 310/258; 310/259; 310/260; 310/270
(58) Field of Search ..................... 310/254, 258, 310/259, 260, 270, 216, 194

(56) References Cited

U.S. PATENT DOCUMENTS

| | | | |
|---|---|---|---|
| 4,584,497 | 4/1986 | Butman, Jr. et al. | |
| 5,051,642 * | 9/1991 | Hediger et al. | 310/260 |
| 5,355,046 * | 10/1994 | Weigelt | 310/260 |
| 5,693,996 * | 12/1997 | Neidhofer et al. | 310/260 |
| 5,798,595 * | 8/1998 | Nilsson et al. | 310/260 |

* cited by examiner

Primary Examiner—Nestor Ramirez
Assistant Examiner—Thanh Lam
(74) Attorney, Agent, or Firm—Nixon & Vanderhye

(57) ABSTRACT

A generator core end support ring is applied to a generator core support at each of its opposite ends. The ring has circumferentially spaced, radially outwardly opening recesses for receiving ends of wedge sub-assemblies each comprising an end wedge having a tapered underside, a tapered slide, a ripple spring, and one or more of a filler strip. The opposite end of each wedge sub-assembly is received in a dovetail stator core slot. Upon application of the sub-assembly to the armature windings spanning between the tapered end core laminations and the end core support, the ripple spring is compressed such that the sub-assembly applies a radial outward force to structurally support the armature windings spanning between the stator core end supports and the location where wedge-supporting dovetails in the stator core begin inboard of the core end.

13 Claims, 8 Drawing Sheets

Fig. 8

GENERATOR CORE END SUPPORT RING FOR APPLYING A RADIAL OUTWARD FORCE TO ARMATURE WINDINGS OUTBOARD OF STATOR CORE SLOT DOVETAILS

TECHNICAL FIELD

The present invention relates to dynamoelectric machines and, more particularly, to an end support for applying radial outward forces to armature windings cantilevered axially outboard of the stator core slot dovetails.

BACKGROUND OF THE INVENTION

Dynamoelectric machines typically employ a stator core comprised of stacked laminations of magnetic material forming a generally annular assembly. An array of axially extending circumferentially spaced slots are formed through the radial inner surface of the annular assembly and armature windings are disposed in the slots. A rotor is coaxially arranged within the stator core and contains field windings typically excited from an external source to produce a magnetic field rotating at the same speed as the rotor. With the foregoing arrangement, it will be appreciated that electrical output is generated from the armature windings.

In typical stator core arrangements, the armature windings are maintained in the axially extending stator core slots by wedges axially disposed in dovetail grooves along or near the radial inner ends of the stator core. The wedges impose radial forces on the armature windings for resisting magnetic and electrically induced radial forces on the windings. In order to prevent excessive heat build-up in the ends of the stator core during operation, it is common practice to taper the ends of the stator core in a radially outer direction. This outward taper intersects the dovetails in the stator slots such that the armature windings extend from the ends of the slots to comprise the end turns without radial structural support.

More particularly, the armature windings of generators operate under continuous strain of electromagnetic forces that must be completely contained to prevent high voltage armature winding insulation damage. Insulation damage is also exacerbated by relative movement of the elements, e.g., the armature windings and stator core. For example, the core end geometry which reduces core heating also leaves the armature windings extending from the stator core unsupported at the ends of the slots. Seal oil leakage, if present, also reduces restraining friction forces applied by side ripple springs. It is also possible that static residual forces exerted by the end windings may displace the armature windings off the core slot bottom, either initially or over time in service, allowing radially outwardly directed electromagnetic forces to initiate armature winding vibration. Radial clearance may also develop over a long period of service due to aging of materials. Once clearance is developed and vibration begins, damage to armature winding insulation can accelerate quickly, particularly in the presence of oil contamination, to a point where electrical failure can occur.

A similar problem exists with respect to P-bar excitation systems, for example, disclosed in U.S. Pat. No. 4,584,497 of common assignee herewith. The P-bar windings extending from the radially innermost dovetail of the dual dovetail system disclosed in that patent are cantilevered and provided with a beam support between the radially inner dovetail and yokes supported on end space blocks of the stator core. In that arrangement, the beam is supported at opposite ends by the radially inner dovetail and the yoke to provide structural support for the P-bar windings and the underlying armature bars within that length. That patent is concerned only with P-bar windings and beam supports therefor. It has been found, however, desirable to not only provide support for the armature windings but also to provide outward radial biasing forces on the armature windings which are unsupported outboard of the stator core dovetails.

BRIEF SUMMARY OF THE INVENTION

In accordance with the present invention, there is provided a non-metallic ring affixed to the metallic support structure at each end of the stator core. The ring, in conjunction with end wedge sub-assemblies and dovetails on the stator core, apply radially outward forces on the armature windings at the end of the stator core which project from the end of the stator core where wedge pressure in the stator core is lost or reduced because of the core end geometry. Particularly, the support structure includes a ring formed of high strength glass fiber-filled resin which is secured to the end of the stator core. The ring has a plurality of circumferentially spaced radially outwardly opening recesses in axial spaced alignment with the axial slots in the stator core. The ring is secured to space blocks which support the stator core end. An end wedge assembly, including an end wedge having surfaces complementary to the dovetail surfaces of the stator core slot, is in part received in the end portion of each stator core slot. The opposite end of the wedge sub-assembly is received in a recess of the ring. Each end wedge sub-assembly spans the end of the stator core slot and the ring and radially underlies the armature windings extending from the stator core slot through the stator core support at the end of the dynamoelectric machine. The undersurface of the end wedge is tapered. A slide having a complementary tapered surface overlies the tapered surface of the end wedge. Radially outwardly of the slide there is provided a ripple spring and a filler strip lying intermediate the end wedge and the extended armature windings. By inserting the ripple spring and insulating filler strip, as well as the end wedge, through the recesses of the ring and radially inwardly of the armature windings and then inserting the tapered slide, it would be appreciated that the wedge sub-assembly can be locked in place while simultaneously applying a radial outward force to the armature windings.

In a preferred embodiment according to the present invention, there is provided apparatus for applying a radial outward force on armature windings extending from stator core slots at an end of a generator stator core, the stator core slots extending axially and having dovetails extending within the slots, the stator core end tapering radially outwardly toward one end and outwardly of the dovetails comprising a support ring at one stator end and lying on a common axis with the stator core, a core end support for securing the ring and the stator core to one another, end wedges at least in part having corresponding surfaces at one end for engaging in the dovetails at end portions of the stator slots, tapered radially outwardly facing surfaces and opposite end portions for engaging the ring at circumferential locations thereabout and slides having tapered radially inwardly facing surfaces engageable with the tapered faces of the end wedges and receivable radially outwardly of the end wedges for maintaining radially outward forces on the armature windings extending from the stator core slots.

In a further preferred embodiment according to the present invention, there is provided a generator stator comprising a stator core having a plurality of radially inwardly opening stator slots spaced circumferentially one from the other about the core and opening through one end thereof, a plurality of armature windings extending in the slots and projecting from the slots at one end of the generator stator core, the stator core slots extending axially and having dovetails extending within the slots, one stator core end tapering radially outwardly of the dovetails, a support ring at one stator end and lying on a common axis with the stator core, a plurality of core end supports for securing the ring and the stator core to one another, end wedges at least in part having corresponding surfaces at one end for engaging in the dovetails at end portions of the stator slots, tapered radially outwardly facing surfaces and opposite end portions for engaging the ring at circumferential locations thereabout and slides having tapered radially inwardly facing surfaces engageable with the tapered faces of the end wedges and receivable radially outwardly of the end wedges for maintaining radially outward forces on the armature windings which are unsupported outboard of the stator core dovetails.

Accordingly, the present invention preferably provides apparatus for applying radial outward biasing forces on armature windings spanning between the stator core end supports and the location where wedge supporting dovetails in the stator core begin inboard of the core end.

DETAILED DESCRIPTION OF THE INVENTION

Figure 1:
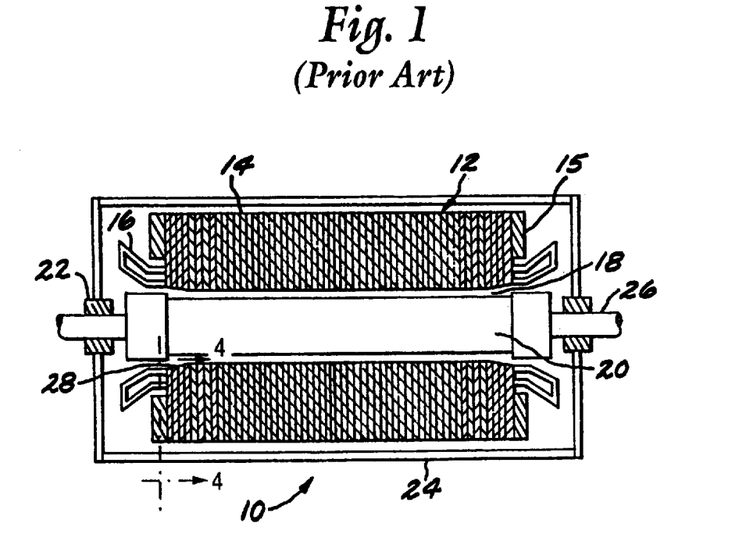
FIG. 1 is a schematic representation in axial cross section of a dynamoelectric machine according to the present invention.
Figure 1A:
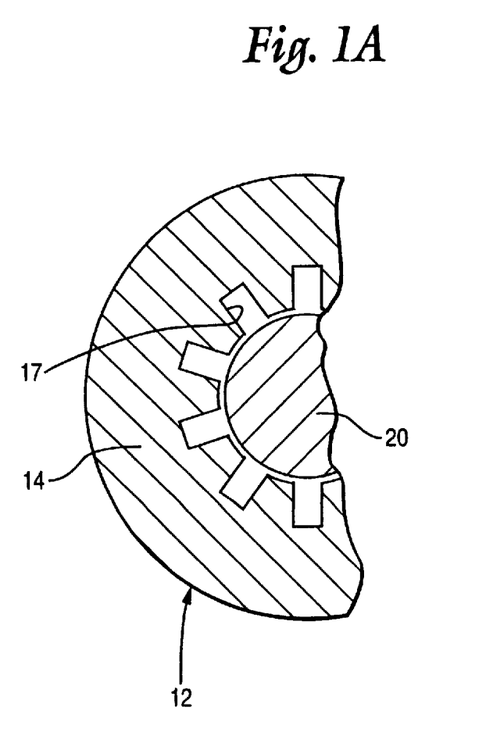
FIG. 1A is a schematic representation of a stator core with slots and a rotor.

Referring to FIGS. 1 and 1A, there is illustrated a dynamoelectric machine generally designated 10 including a stator generally indicated 12 having a stator core 14 built up from a stack of laminations of magnetic material. The stacked laminations are compressed by axial forces applied to the ends thereof through core supports 15. A plurality of armature windings 16 are axially disposed in slots 17 (FIG. 1A) extending the length of the stator core. The slots 17 open radially inwardly and armature windings 16 extend along the slots to extend beyond the axial end extremities of the stator core 14 terminating in end turns. Stator 12 forms an annular body having a cylindrical opening 18 on its axis for receiving a rotor 20 mounted on suitable bearings 22 in a machine frame 24 rotatably supporting end shafts 26 of rotor 20.

Figure 2:
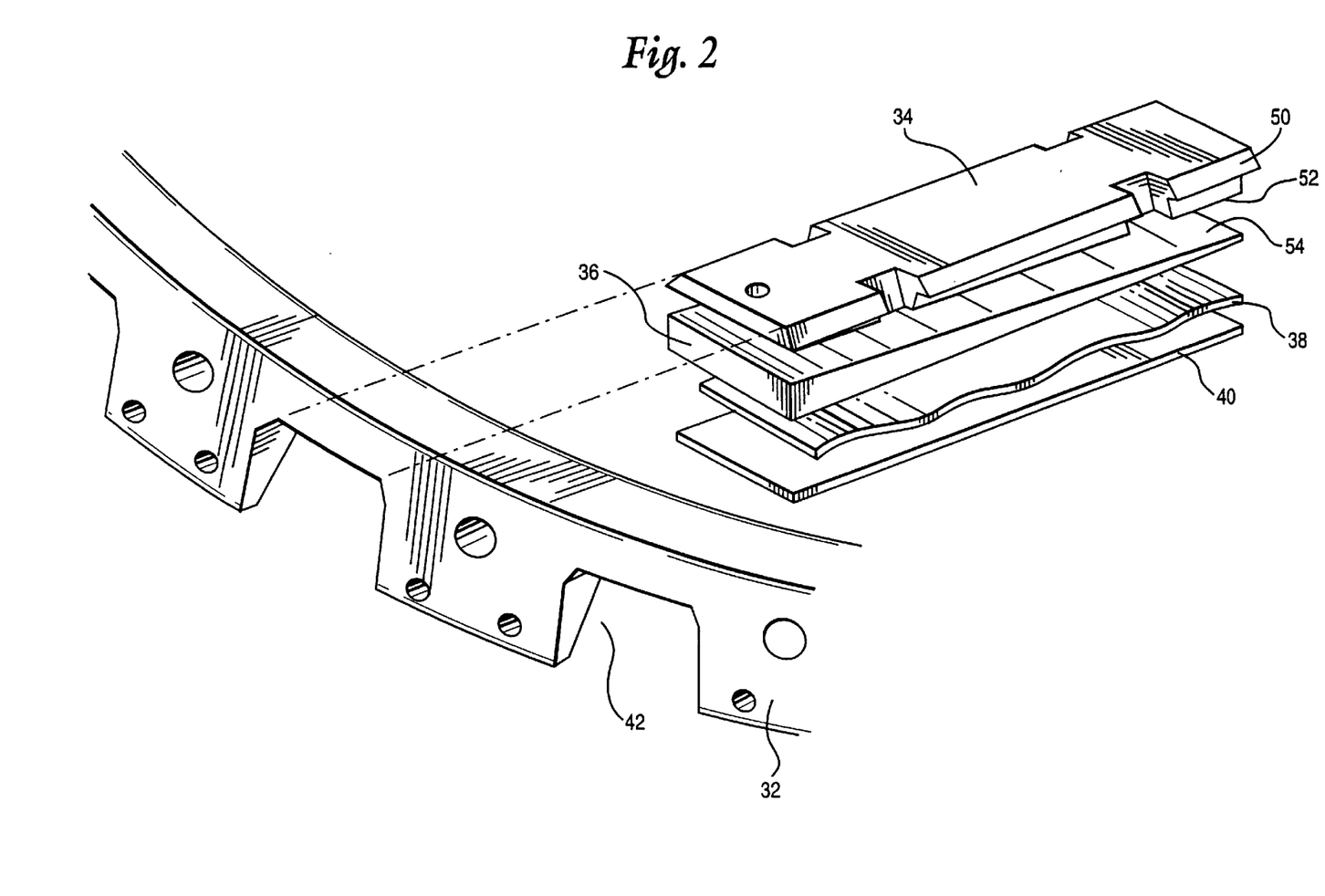
FIG. 2 is an enlarged perspective view illustrating the end support ring and wedge sub-assembly according to the present invention.
Figure 3:
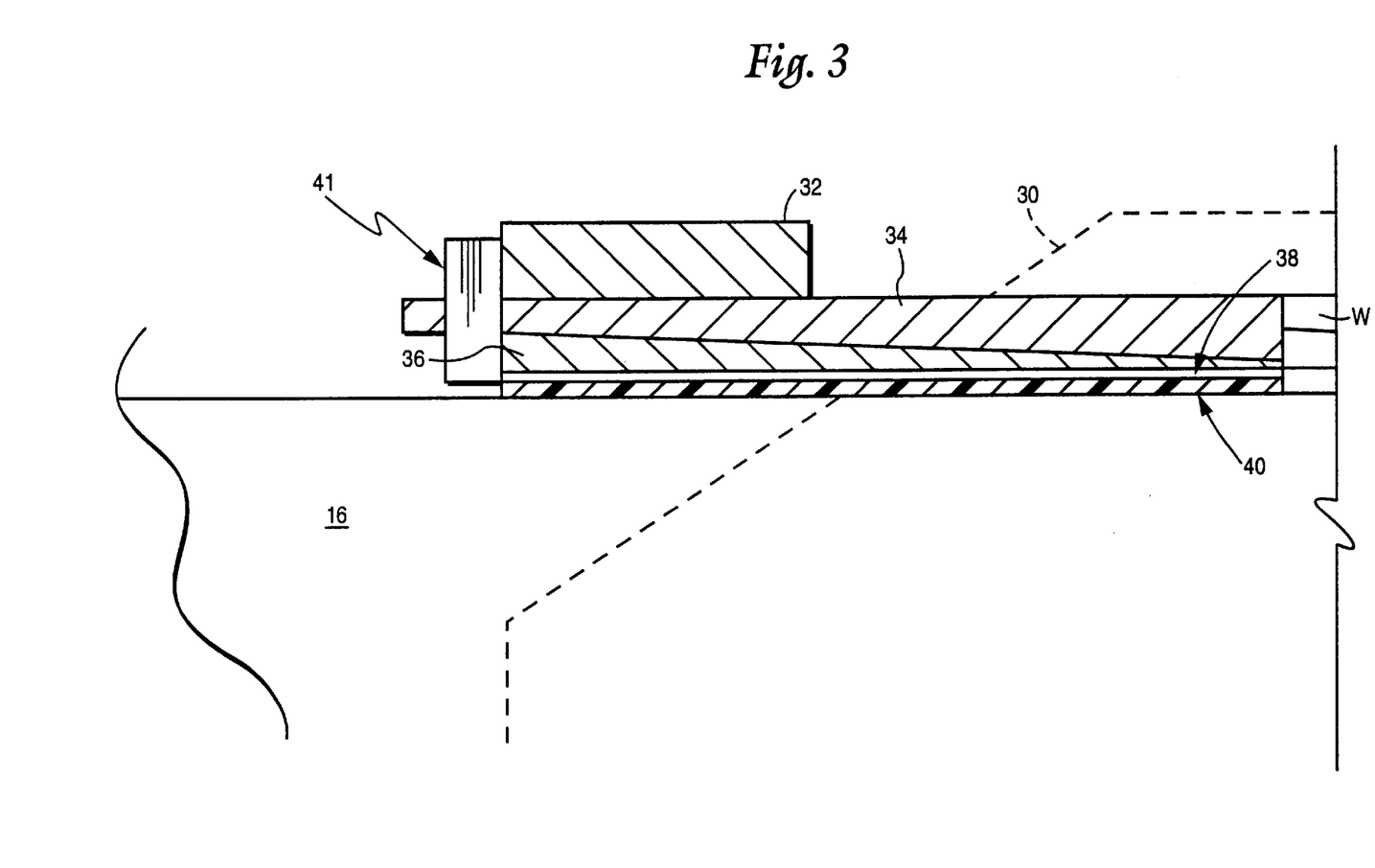
FIG. 3 is a fragmentary lateral cross sectional view through an end of the stator core taken generally on line 3—3 in FIG. 4 illustrating the end core support ring and ancillary parts.

Referring now to FIGS. 2 and 3, it will be appreciated that in accordance with conventional practice, wedges, for example, wedge W schematically represented in FIG. 3, have dovetails which seat in complementary-shaped dovetails in the axial stator core slots 17 for structurally supporting the armature windings extending axially through the slots. As illustrated in FIG. 3, the end surfaces of the stator core are tapered radially outwardly as indicated by the diagonal line 30. That is, the inner peripheral surfaces of the stator laminations at the opposite ends of the stator core increase in diameter radially outwardly to the ends of the stator core as represented by the line 30 in FIG. 3. Consequently, the armature windings 16 inboard of the end of the stator core are unsupported within the tapered end of the stator core.

Figure 4:
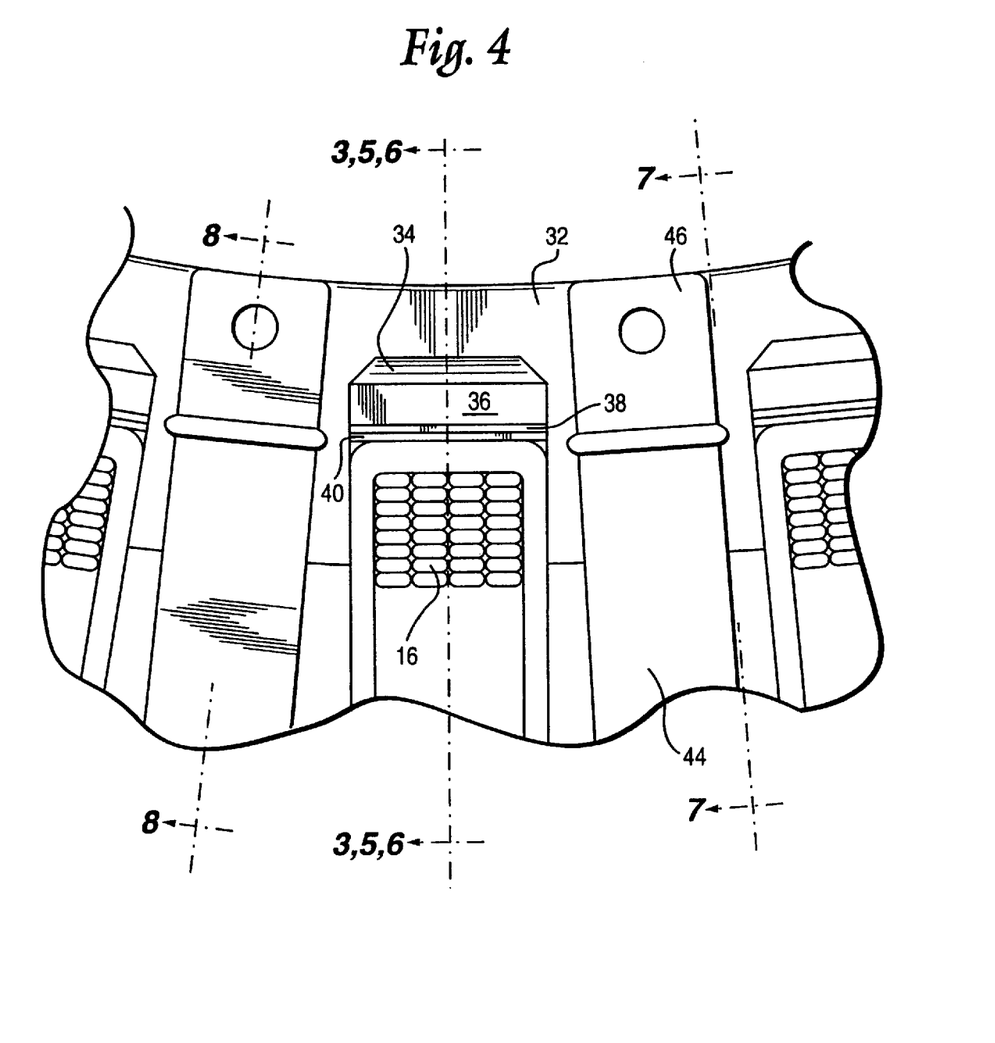
FIG. 4 is a fragmentary end elevational view thereof taken generally about on line 4—4 in FIG. 1.

To support the windings in this unsupported region of the stator core and to provide a radial outward force on the armature windings in that region, the present invention provides a support assembly including a core end support ring 32, and an end wedge sub-assembly including an end wedge 34, a slide 36, a ripple spring 38, and one or more of a filler strip 40. The end support ring 32 includes a plurality of circumferentially spaced radially outwardly opening recesses 42 for receiving the end wedge sub-assembly. As illustrated in FIG. 4, the ring 32 is secured to a core support comprising a plurality of space blocks 44. Each space block is secured to the end laminations of the stator core 12 and includes a radially inwardly extending flange 46. The ring 32 is secured to the axial inner faces of the flanges 46 by studs 48 and by ties 58. It will be appreciated that the recesses 42 of ring 32 are axially aligned with the slots 17 of the stator core.

The end wedge 34 of each end wedge sub-assembly comprises a short length of a wedge having surfaces 50 along opposite edges complementary in shape to the dovetails in the slots 17 of the stator core. Additionally, as illustrated in FIGS. 2 and 3, the radially outer surface 52 of each end wedge 34 is tapered in an axially outward direction. The axially outer end of end wedge 34 is also sized for reception in the recess 42. The slide 36 comprises a wedge having a radially inner surface 54 tapered complementary in slope to the slope of the tapered surface 52 of end wedge 34. Ripple spring 38 comprises an elongated spring having corrugations extending transversely. One or more of a filler strip 40 is comprised of an electrically insulating material for mechanically segregating the ripple spring 38 from the armature windings in the stator core slots 17 and for filling radial clearance. Finally, ties 58 are employed to provide further mechanical securement of the ring to the core end supports. The ties 58 may be preimpregnated with a heat curable resin cured after application of the tie to the assembly.

Figure 5:
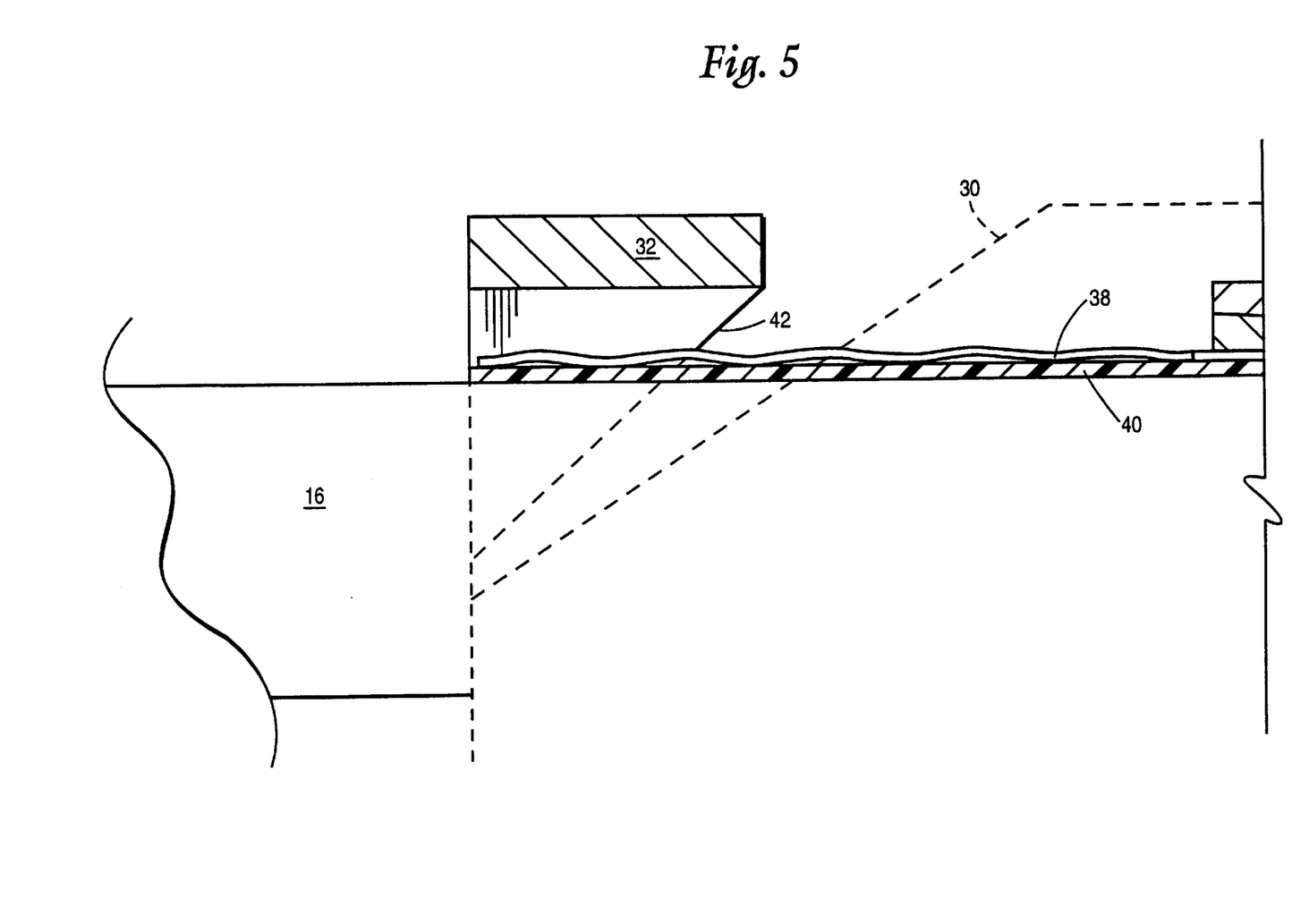
FIGS. 5 and 6 are views similar to FIG. 3 illustrating the sequence of steps for installing the support for the armature windings outboard of the core slot dovetails.
Figure 6:
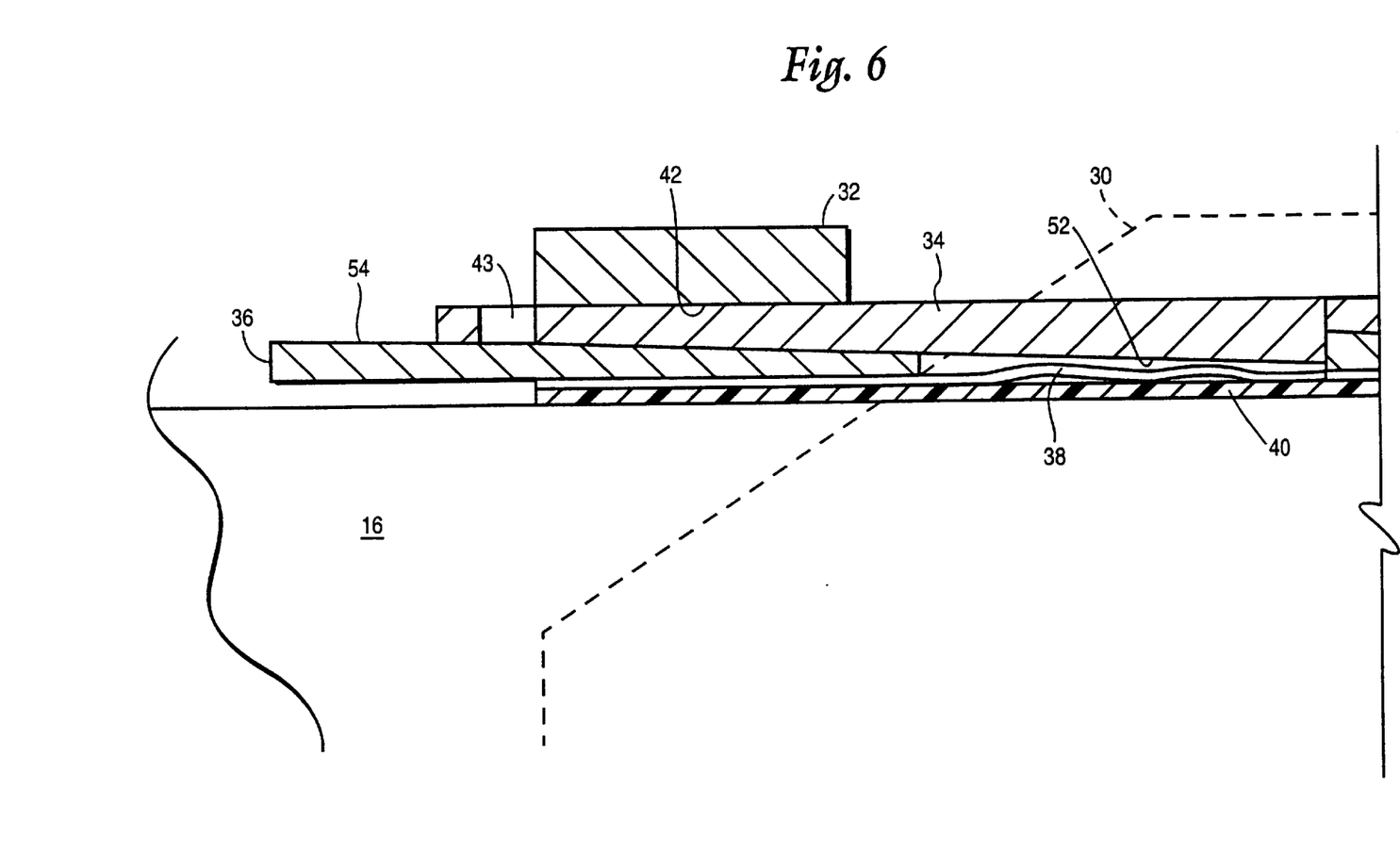
Figure 7:
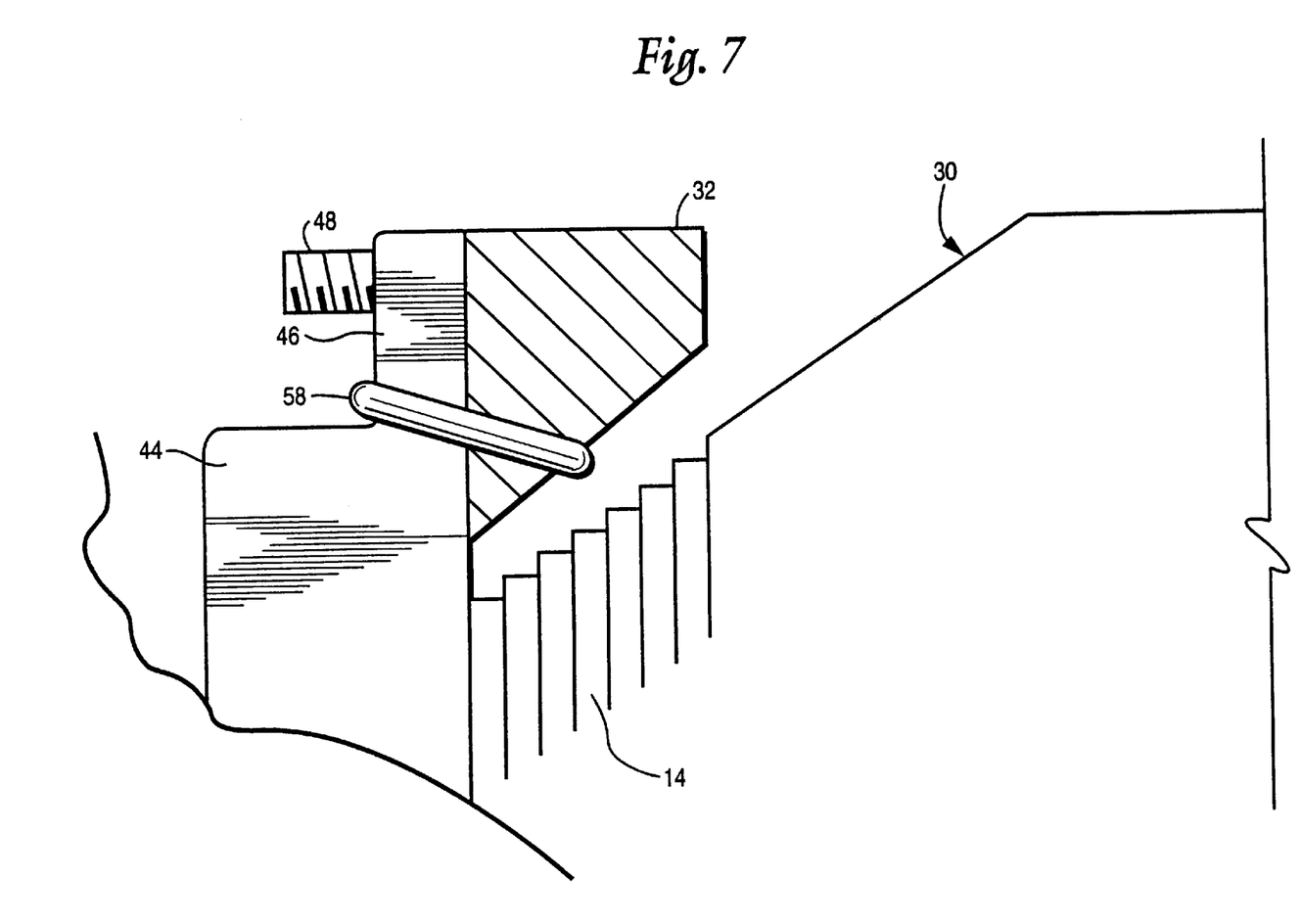
FIG. 7 is a fragmentary lateral cross-sectional view through an end of the stator core taken generally on line 7—7 in FIG. 4 illustrating the core end support, support ring and tie.
Figure 8:
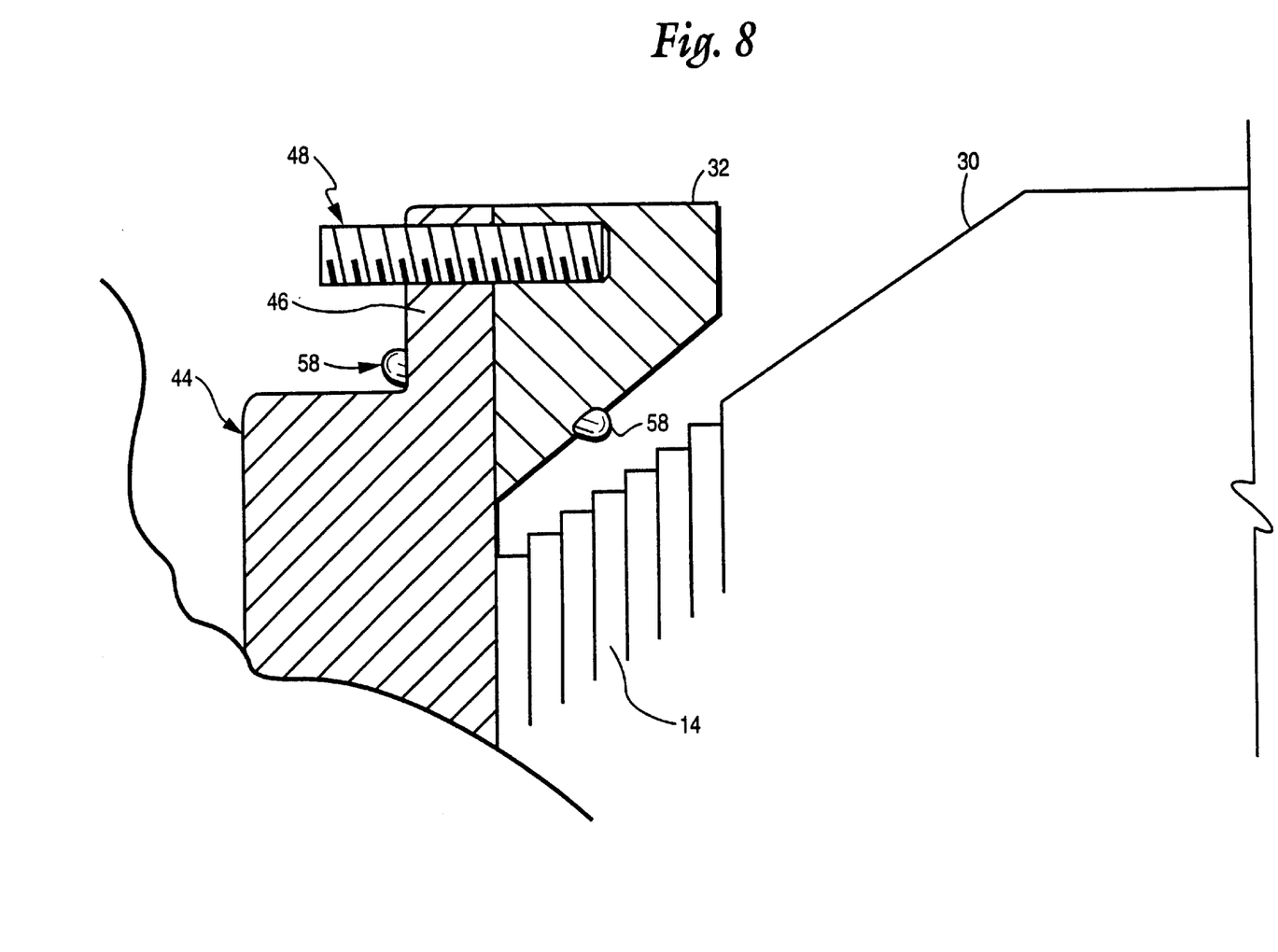
FIG. 8 is a fragmentary lateral cross-sectional view through an end of the stator core taken generally on line 8—8 in FIG. 4 illustrating the core end support ring, core end support, stud and tie.

To install the core end support ring and the end wedge sub-assemblies into the dynamoelectric machine, the wedges W are first applied in the stator core slots underlying the armature windings in a conventional fashion. The wedges are axially disposed within the slots until the slots are substantially occupied by the wedges but which wedges extend short of the tapered ends 30 of the stator core. To provide the radial support for the armature windings and also a radially outward biasing force to the armature windings spanning between the end of the stator core and the core support represented by the spacer blocks 44, the ring 32 is secured to the core end supports by inserting the studs 48 into corresponding openings in the ring. A suitable adhesive is applied to bond the ring to the core end supports. Resin-impregnated glass ties are applied through holes in the ring and around the core end supports. One or more of a filler strip 40 and ripple spring 38 are then applied over the armature windings as in FIG. 5. The end wedge 34 is then inserted axially through the recess 42 with the inner end of the end wedge 34 engaging in the terminal portion of the dovetail-shaped slot 17 of the stator core. In this manner, the axial inner end of the end wedge 34 is supported in the stator core. The opposite end of the end wedge 34 lies within the recess 42. Next, the tapered slide 36 is inserted, tapered end first, in an axial direction and between the outer end of the end wedge 34 and the ripple spring 38 as illustrated in FIG. 6. By driving the slide axially inwardly, the end wedge 34 is engaged against the base of the recesses 42 on ring 32 and the dovetails of the core slots. Simultaneously, the slide 36 tends to straighten the ripple spring 38. When the slide has been installed into the final position, as illustrated in FIG. 3, it will be appreciated that the ripple spring 38 exerts radial forces on the slide 36 and the filler strip 40 and, hence, applies a radial outward force to the armature windings spanning the end of the stator core and the ring. To secure the slide 36, ripple spring 38 and filler 40, a radial dowel 41 (FIG. 3) is inserted into an opening 43 (FIG. 6) in the end wedge and secured with a suitable adhesive.

It will be appreciated that in final assembly, the wedge sub-assembly applies a radial outward bias to the armature windings between the stator core end supports and the location where wedge-supporting dovetails in the stator core begin inboard of the core end. The outward bias precludes winding vibration at the ends of the stator core. Further, the present invention is not only applicable to new dynamoelectric machines but may also be retrofit into existing machines.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for applying a radial outward force on armature windings extending from stator core slots at an end of a generator stator core, the stator core slots extending axially and having dovetails extending within the slots, said stator core end tapering radially outwardly toward said one end and outwardly of the dovetails comprising:

a support ring at said one stator end and lying on a common axis with the stator core;

a core end support for securing said ring and said stator core to one another;

end wedges at least in part having corresponding surfaces at one end for engaging in the dovetails at end portions of the stator slots, tapered radially outwardly facing surfaces and opposite end portions for engaging said ring at circumferential locations thereabout; and slides having tapered radially inwardly facing surfaces engageable with the tapered faces of said end wedges and receivable radially outwardly of said end wedges for maintaining radially outward forces on the armature windings extending from the stator core slots.

2. Apparatus according to claim 1 wherein said ring includes a plurality of recesses opening radially outwardly for receiving said wedge end portions and said slides respectively.

3. Apparatus according to claim 1 including ripple springs disposed between said slides and the armature windings for forcing the armature windings in radial outward directions.

4. Apparatus according to claim 3 including filler strips disposed between said ripple springs and said armature windings.

5. Apparatus according to claim 1 wherein said ring is formed from at least two arcuate segments.

6. Apparatus according to claim 1 wherein said ring is formed of a high strength glass fiber filled resin.

7. A generator stator comprising:

a stator core having a plurality of radially inwardly opening stator slots spaced circumferentially one from the other about the core and opening through one end thereof;

a plurality of armature windings extending in said slots and projecting from said slots at said one end of the generator stator core, the stator core slots extending axially and having dovetails extending within the slots, said one stator core end tapering radially outwardly of the dovetails;

a support ring at said one stator end and lying on a common axis with said stator core;

a plurality of core end supports for securing said ring and said stator core to one another;

end wedges at least in part having corresponding surfaces at one end for engaging in the dovetails at end portions of the stator slots, tapered radially outwardly facing surfaces and opposite end portions for engaging said ring at circumferential locations thereabout; and slides having tapered radially inwardly facing surfaces engageable with the tapered faces of said end wedges and receivable radially outwardly of said end wedges for maintaining radially outward forces on the armature windings extending from the stator core slots.

8. A stator according to claim 7 wherein said ring includes a plurality of recesses opening radially outwardly for receiving said wedge end portions and said slides respectively.

9. A stator according to claim 7 including ties for securing said ring to the core end supports.

10. A stator according to claim 7 including ripple springs disposed between said slides and said armature windings for biasing said armature windings in radial outward directions.

11. A stator according to claim 10 including filler strips disposed between said ripple springs and said armature windings.

12. A stator according to claim 7 wherein said ring is formed from at least two arcuate segments.

13. A stator according to claim 7 wherein said ring is formed of a high strength glass fiber filled resin.

* * * * *